United States Patent Office 3,547,938
Patented Dec. 15, 1970

3,547,938
BENZAZOLYLTHIO ALKYL ISOTHIOCYANATES
John Joseph D'Amico, Dunbar, W. Va., assignor to Monsanto Company, St. Louis, Mo., a corporation of Delaware
No Drawing. Filed Oct. 7, 1968, Ser. No. 765,694
Int. Cl. C07d 85/48, 91/48
U.S. Cl. 260—306.6
7 Claims

ABSTRACT OF THE DISCLOSURE

Compounds of the formula

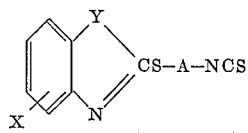

where X represents hydrogen, halogen, or alkoxy, Y represents oxygen or sulfur, and A is lower alkylene are described which are useful as biological toxicants.

---

The present invention relates to a class of benzazolylthio alkyl isothiocyanates useful as biological toxicants, to biocidal compositions, and to control of various microorganisms.

The compounds of the present invention may be represented by the following general formula:

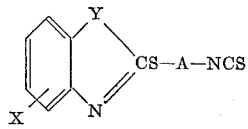

in which X represents hydrogen, halogen, or alkoxy; Y represents oxygen or sulfur; and A is lower alkylene. The halogen is preferably chlorine in the 5-position. and the alkoxy group is preferably ethoxy in the 6-position. A is preferably ethylene but may be methylene, propylene, butylene, or pentylene.

The benzazolylthio ethyl isothiocyanates may be prepared by and formulated by methods hereinafter described. The following examples illustrate preparation of the compounds embraced within the scope of the invention.

EXAMPLE 1

To a stirred solution comprising 20.1 grams (0.1 mole) of 5-chloro-2-mercaptobenzothiazole, 6.6 grams (0.1 mole) of 85% potassium hydroxide, 200 ml. of acetone, and 5 ml. of water was added in one portion 16.1 grams (0.1 mole) of 2-bromoethyl isothiocyanate. After heating at 50°–56° C. for 18 hours, the mixture then was cooled to 25° C. and 400 ml. of water and 400 ml. of ethyl ether were added. The ether layer was separated, washed with water until the washings were neutral to litmus, and dried over sodium sulfate. The ether was removed in vacuo at a maximum temperature of 80°–90° C./1–2 mm. 2-(5-chloro-2-benzothiazolylthio)ethyl isothiocyanate was obtained as an amber viscous oil in 87% yield. Analysis gave 9.61% nitrogen and 32.97% sulfur as compared to 9.77% nitrogen and 33.54% sulfur calculated for $C_{10}H_7ClN_2S_3$

EXAMPLE 2

Following the procedure described in detail in Example 1, 32.2 grams (0.2 mole) of 2-bromoethyl isothiocyanate was added in one portion to a stirred solution formed by dissolving 34.4 grams (0.2 mole) of 97% mercaptobenzothiazole in 200 ml. of acetone and 10 ml. of water containing 13.2 grams (0.2 mole) of 85% potassium hydroxide. The 2-(2-benzothiazolylthio)ethyl isothiocyanate, obtained in 93.5% yield, was an amber liquid and on analysis was found to contain 11.32% nitrogen and 37.68% sulfur as compared to 11.10% nitrogen and 38.12% sulfur calculated for $C_{10}H_8N_2S_3$.

EXAMPLE 3

Again following the procedure described in detail in Example 1, 16.1 grams (0.1 mole) of 2-bromoethyl isothiocyanate was added in one portion to a stirred solution formed by dissolving 21.1 grams (0.1 mole) of 6-ethoxy-2-mercaptobenzothiazole in 150 ml. of acetone and 5 ml. of water containing 6.6 grams (0.1 mole) of 85% potassium hydroxide. The 2-(6-ethoxy-2-benzothiazolylthio)ethyl isothiocyanate, obtained in 94.5% yield, was a viscous amber oil. Analysis gave 9.50% nitrogen and 31.76% sulfur compared to 9.45% nitrogen and 32.45% sulfur calculated for $C_{12}H_{12}N_2OS_3$.

The biological activity of the compounds of this invention was illustrated in a variety of experiments as will be described more fully hereinafter. The biological compositions were prepared according to common methods for convenience of application to the control of various organisms. The concentration of the compounds in the carrier or vehicle varied depending upon the organisms being treated and the particular compound of the generic formula which was employed. Some of the compounds were especially useful as the active ingredient in toxic quantities in soil fungicidal compositions. 5-chloro-2-(benzothiazolylthio)ethyl isothiocyanate, for example, was effective against damping-off fungi and *Venturia inaequalis*. This is significant because the organisms represent both soil and foliage disease-causing organisms.

Destruction of fungi present in soil was demonstrated by treating soil with the test material, incubating for 24 hours, and sowing seeds in the incubated soil. Disease incident was assesed after 10–14 days. A stock solution of the test material was pipetted into a glass jar containing one pound of infested soil. The "damping-off" fungi present were principally Pythium. Rhizoctonia, and Fusarium species. The jar was sealed and the contents thoroughly mixed by vigorous shaking. The treated soil was incubated at room temperature for 24 hours, transferred to clay pots, and 15 seeds of each of two crop plants sown in each pot. The crop plants were Delta Pine No. 15 cotton and Straight Eight cucumber. The seeded pots were then incubated at 70° F. at 98% humidity to insure activity of the organisms in the soil. Twenty-four hours later the pots were removed to a greenhouse and disease assessments made within 10–14 days. The percent emergence and disease incidence were recorded. The ratings were based on inoculated, untreated, and uninoculated sterile soil treatments. For conveneince in recording the data, the following rating scale was used:

| Rating: | Healthy plants out of 30 |
|---|---|
| E | 26–30 |
| P | 19–25 |
| F | 13–18 |
| N, not effective | <13 |

The results are recorded below:

TABLE I

| Toxicant | Concentration, p.p.m.* | Soil fungicide rating |
|---|---|---|
| 2-(5-chloro-2-benzothiazolylthio)ethyl isothiocyanate | 10<br>3 | P<br>F |
| 2-(2-benzothiazolylthio)ethylisothiocyanate | 30 | F |
| 2-(6-ethoxy-2-benzothiazolylthio)ethyl isothiocyanate | 30 | E |

*Parts per million of toxicant in the soil.

2-(5-chloro-2-benzothiazolylthio)ethyl isothiocyanate protected apple foliage from *Venturia inaequalis,* causative organism of apple scab. A 1.0% stock solution of the test chemical in a non-toxic solvent was made, and an aliquot thereof diluted to the desired concentration and applied to the leaves of new growth of apple seedlings. Twenty-four hours later conidia of *Venturia inaequalis* was sprayed on the same foliage. The inoculation was obtained from four isolates of Venturia representing the three races and a wild isolate, all cultured on potato dextrose broth and harvested after four weeks growth. Spores from all cultures were mixed and the spore load adjusted to 10,000 spores per ml. The inoculated plants were then incubated in a greenhouse chamber and disease incidence recorded after 14–20 days incubation. Perfect control at 3 p.p.m. was observed.

At a concentration of 1250 parts per million on cucumber plants, 2-(2-benzothiazolylthio)ethyl isothiocyanate gave excellent control of *Colletotrichum lagenarium,* the causative agent of cucumber anthracnose. Significant control of the same organism on cucumber plants was observed with the same concentration of 2-(6-ethoxy-2-benzothiazolylthio)ethyl isothiocyanate.

Controlling harmful and unwanted parasites present in the soil, such as nematodes, is an important problem of considerable complexity. Some of the compounds are effective for this purpose. In order to be an effective toxicant, a compound must be able to penetrate the normally impervious outer covering of the worm as well as the enclosing membranes of the larvae and eggs and to interfere with some vital function of the organism. While the exact mechanism of destroying the soil worm life is not fully understood, it is believed that the effective toxicants destroy or reduce to a low level the effectiveness of vital enzymes. A compound which is effective must be one that will remain in the soil in contact with the undesirable worm life for a sufficient period of time to effect the penetration of the worm and to destroy it by one means or another. To accomplish this result, it is necessary that the toxicant resist the destructive action of soil bacteria, be capable of wetting or penetrating the parasite, possess a substantial water dispersibility, be capable of ready mixture with the soil, and possess a sufficiently low vapor pressure so that it does not evaporate before its destructive action is accomplished. Since the exacting requirements of any practical agent cannot be recognized by methods other than by test, it is necessary to observe the effectiveness of chosen compounds against the life cycle of the parasite.

Nematocidal activity was demonstrated by preparing a suspension of the nematode *Panagrellus redivivus* in water and observing through a microscope the motility of the organisms in the presence of various concentrations of the test material. The nematode in aqueous suspension will flex its body at a regular rate; and, as the nematocide takes effect, the rate of flexing is decreased until death of the parasite occurs. The control containing no added toxicant showed undiminished activity after 24 hours, whereas complete destruction of the nematode was effected with 1 p.p.m. of 2-(5-chloro-2-benzothiazolylthio)ethyl isothiocyanate and 1 p.p.m. of 2-(6-ethoxy-2-benzothiazolylthio)ethyl isothiocyanate.

EXAMPLE 4

To a stirred solution comprising 22.5 grams (0.15 mole) of 2-benzoxazolethiole, 200 ml. of acetone in 10 ml. of water, and 9.9 grams (0.15 mole) of 85% potassium hydroxide was added in one portion 25 grams (0.15 mole) of 2-bromoethyl isothiocyanate. The mixture was heated at 50°–60° C. for 6 hours, then stirred at 25°–30° C. for 18 hours. There was then added 400 ml. of water and 500 ml. of ethyl ether and the mixture stirred for 15 minutes. The ether layer was separated, washed with water until the washings were neutral to litmus, and dried over sodium sulfate. The ether was removed in vacuo at a maximum temperature of 80°–90° C./1–2 mm. 2-(2-benzoxazolylthio)ethyl isothiocyanate was obtained in 93% yield as a viscous amber oil, insoluble in water, but soluble in ether, acetone, benzene, chloroform, ethyl acetate, and hot ethanol, and slightly soluble in hot heptane. Analysis gave 12.16% nitrogen and 27.92% sulfur as compared to 11.86% nitrogen and 27.14% sulfur calculated for $C_{10}H_8N_2OS_2$.

The compound 2-(2-benzoxazolylthio)ethyl isothiocyanate is toxic to a variety of organisms. Toxicity to all the test organisms in the table below was demonstrated at the indicated concentration of the toxicant. A toxicity rating to the fungus was assigned by a numerical code of 1 to 5, in which 1 designated severe toxicity or complete kill of the fungus and 5 designated no kill or inactivity. The results were as follows:

TABLE II

| Test organism | Concentration, p.p.m. | Toxicity rating |
|---|---|---|
| Venturia | 10 | 1 |
| Phytophthora | 10 | 1 |
| Rhizoctonia | 30 | 2 |
| Pythium | 30 | 2 |
| Nematodes | 30 | 2 |

In experiments which demonstrated useful control of other fungi and of bacteria, a 1.0% stock solution of 2-(2-benzoxazolylthio)ethyl isothiocyanate was prepared in a non-toxic solvent and diluted in agar to provide ten samples containing various concentrations of the test material. Petri dishes were respectively filled with the test mixture and the plates thus prepared inoculated with the test organism. After a suitable incubation period, inspection of the plates showed complete inhibition of the growth of the organism at the indicated concentration while identical agar test plates, except that none of the aforesaid toxicant was present, showed normal uninhibited growth.

Test organism:　　　Complete inhibition at concentration of:
　S. Aureus _____ 1 part per million.
　S. Typhosa _____ 1 part per thousand.
　A. Niger _____ 1 part per hundred thousand.

At higher concentrations 2-(2-benzoxazolylthio)ethyl isothiocyanate is useful as a herbicide. Application as a 0.5% spray killed two-week old plants of sugar beet, pigweed, and tomato and severely injured radish and sorghum. Sugar beet, tomato, radish, and sorghum are representative of plant families to which important weeds belong.

The foregoing experiments demonstrate that the compounds protect against the destructive effect of microorganisms including fungi and bacteria. Application of the test chemical to the area to be protected, in which the organism may or may not already be present, in a concentration toxic to such microorganisms, affords a high degree of protection. For achieving these various objects, it is often advantageous, where the compounds are applied in an aqueous medium, to incorporate into the aqueous medium a surface-active agent in small amounts sufficient to lower the surface tension of water. The amount will usually be within the range of 0.01–1.0%. Besides water, organic solvents, and admixtures thereof, suitable inert carriers which include finely divided solids, as for example clay and silica, may be added.

It is intended to cover all changes and modifications of the examples of the invention herein chosen for purposes of disclosure which do not constitute departures from the spirit and scope of the invention. The matter contained in each of the following claims is to be read as part of the general description of the present invention.

What is claimed is:
1. A compound of the formula

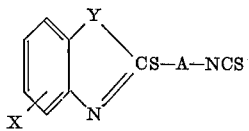

where X is selected from the group consisting of hydrogen, halogen, and lower alkoxy; Y is oxygen or sulfur; and A is lower alkylene.

2. A compound of claim 1 where Y is oxygen.
3. A compound of claim 1 where Y is sulfur.
4. A compound of claim 1 where X is hydrogen, Y is sulfur, and A is ethylene.
5. A compound of claim 1 where X is 5-chloro, Y is sulfur, and A is ethylene.
6. A compound of claim 1 where X is 6-ethoxy, Y is sulfur, and A is ethylene.
7. A compound of claim 1 where X is hydrogen, Y is oxygen, and A is ethylene.

References Cited

UNITED STATES PATENTS

| 2,158,022 | 5/1939 | Lichty | 260—306.6 |
| 2,391,993 | 1/1946 | Mathes | 260—306.6 |
| 3,309,378 | 3/1967 | Dunn | 260—307 |

ALEX MAZEL, Primary Examiner

R. J. GALLAGHER, Assistant Examiner

U.S. Cl. X.R.

260—306, 307; 424—270, 272